RADIO-ELECTRIC TRANSMITTING SYSTEM

Filed Jan. 21, 1948 2 Sheets-Sheet 1

INVENTOR.
Raymond Villem
BY
Michael S. Striker
Agt.

INVENTOR.
Raymond Villem
BY
Michael S. Striker
Agt

Patented Nov. 14, 1950

2,529,667

UNITED STATES PATENT OFFICE 2,529,667

RADIO-ELECTRIC TRANSMITTING SYSTEM

Raymond Villem, Paris, France, assignor to Societe Francaise Radio-Electrique, a corporation of France Application January 21, 1948, Serial No. 3,630
In France January 4, 1947

Section 1, Public Law 690, August 8, 1946
Patent expires January 4, 1967

3 Claims. (Cl. 250—6)

The present invention relates to improvements in radio-electric communication systems (so-called "radio networks") comprising fixed stations and mobile stations, said improvements being intended to increase the range of such systems while retaining for the working of the apparatus conditions which are as simple as in the case of a station to station transmission. The arrangements provided have essentially for their object: on the one hand, to prevent the quality of the communications from being influenced by interference between several fixed stations simultaneously transmitting the same message intended, say, to one of the mobile stations, the last mentioned station being the only one to reply: on the other hand to enable frequency modulated wave communications to enjoy, as regards the signal to noise ratio, the same advantages as those obtained by amplitude modulation with diversity reception.

The chief features of the invention are:

1. The use of frequency modulated networks for reducing the interferences between the stations;

2. Design of the receivers so as to make it possible to receive the waves from several frequency modulated transmitters working on different wavelengths;

3. A particular design of receivers working on the same wavelength.

Figure 1:
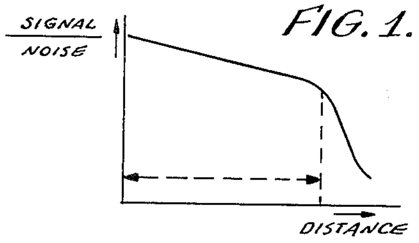
Figs. 1–4 are diagrams for explaining the principle of the present invention.

The invention is based on the following considerations: When a frequency modulated transmitting station is working with a given modulation index and at a given power, if the curve of the ratio signal/parasitic noise or $$\frac{s}{p}$$

obtained at the output of a receiver, be plotted against the distance D, it is found that there is a critical distance $d$ beyond which this ratio decreases very suddenly (see Figure 1 of the accompanying drawings). It can, therefore, be said that frequency modulation gives the transmitting stations a predetermined and much more sharply defined range than does amplitude modulation.

Figure 2:
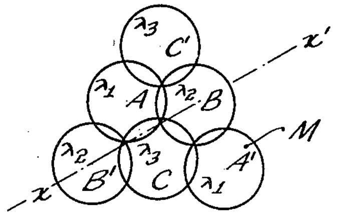

The advantage of the application of frequency modulation to radio networks will be more clearly understood on reference to Figure 2 of the drawings, which, in order to give a concrete idea, shows a network of six transmitting stations A, B, C, A′, B′, C′, working with frequency modulation on three different wavelengths $\lambda_1$ (for A and A′), $\lambda_2$ (for B and B′), $\lambda_3$ (for C and C′), the receiver being mounted on a mobile station M which moves over all the territory comprised within the range limits of the stations and formed by the system comprised in the six circles. The distances between three neighboring stations, marked on a map by three points forming a triangle, are chosen as functions of the respective critical distances designated by $d$ in Fig. 1 of the stations in such a manner that the superposition of their respective circular zones of reception only permits these stations to be received in the interior of this triangle.

The transmitting wavelengths are chosen, on the one hand sufficiently far apart to enable the bands which they occupy when they are frequency modulated to be separated; on the other hand they must be sufficiently close together to enable them to be handled, in the receiver, in a group of common circuits.

Furthermore all the stations are simultaneously modulated by means of the same microphone located in a control station, not shown in Figure 2. The connecting lines between the stations and the control station are assumed to be corrected as regards the time of propagation so that the modulation currents reach the transmitting stations in phase.

Figure 3:
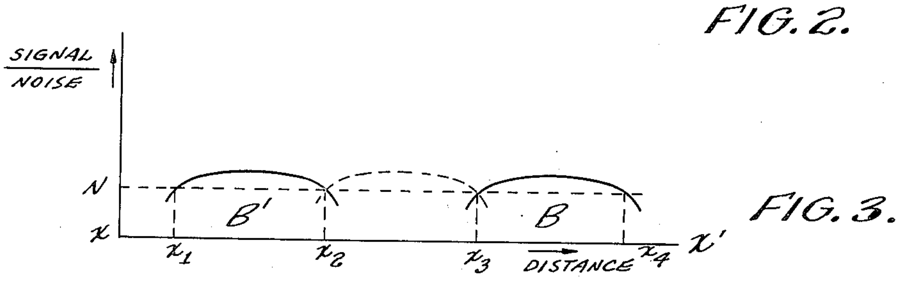

If the different values $$\frac{s}{p}$$

of the signal/nois ratios at the receiver M are plotted against the movement of said receiver along the axis $x\,x'$ (Figure 2), the curves shown in Figure 3 will be obtained. The full line curves respectively correspond to the signal/noise ratio obtained with the stations B and B′ working on the wavelength $\lambda_2$: the dotted line curve corresponds to this same ratio for the stations A and C whose wavelengths are respectively $\lambda_1$ and $\lambda_3$.

The extreme ranges will be considered to be those defined by the value N of the signal/noise ratio obtained at the critical distance, and it will be observed that, on account of the critical distances $B'x_2$ and $Bx_3$, which are characteristic of frequency modulated communications, there will be no troublesome interference between the stations B and B′ which are working on the same wavelength.

Figure 4:
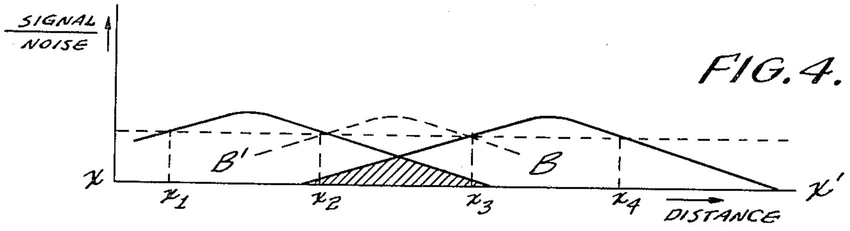

On the other hand, with amplitude modulation, if it were desired to obtain the same signal/noise ratio as previously then, since the rate of decrement of that ratio is progressive, it would be necessary to replace Figure 3 by Figure 4 from which latter it can be seen, as in the hatched region that troublesome interference occurs between the stations B and B′. Such interference would become apparent in the following manner:

If the stations B and B′ were synchronized, as the mobile receiver moved it would register maximum variations of level every time the waves from B and B′ had to travel distances differing from $$\frac{\lambda}{2}$$

If the stations B and B′ were working on closely adjacent frequencies, the mobile receiver would, even without moving, pick up the speech currents modulated at the beat frequency between the stations B and B′.

For clearer understanding of the arrangement of the receiver of the mobile station enabling stations working on different wavelengths to be received, a concrete case will be explained, by way of non-limitative example.

Let it be assumed that the fixed stations are frequency modulated by means of the speech currents with a deviation of $\pm 12$ kilocycles per second from the frequency of their carrier wave. It is known that, under these conditions, the frequency band occupied by each station is limited in practice to $\pm 24$ kilocycles per second. Such a band is quite admissible on very short and ultra-short waves, and the carrier frequencies of the fixed stations should be so chosen that there is a difference of, say, 60 kilocycles per second between them, just sufficient to enable them to be separated in the mobile receiver, making allowance for frequency drift and the possibilities of filtration.

According to the invention, the mobile receiver comprises an amplifying and frequency changing system capable of passing all the wave-bands radiated by the stations. In general, this system, which is indicated at (P) in Figure 5, comprises a high frequency amplifier 1 followed by a first frequency changer 2 and a first intermediate frequency amplifier 3; after this latter valve comes a second frequency changer 4 for which the input frequencies may be in the region of, say, 800 kilocycles per second; then follows a second intermediate frequency amplifier 5 and an amplitude limiter 6 for all the waves received. The frequency changing oscillators 7 and 8 are preferably crystal stabilized.

Figures 5, 6:
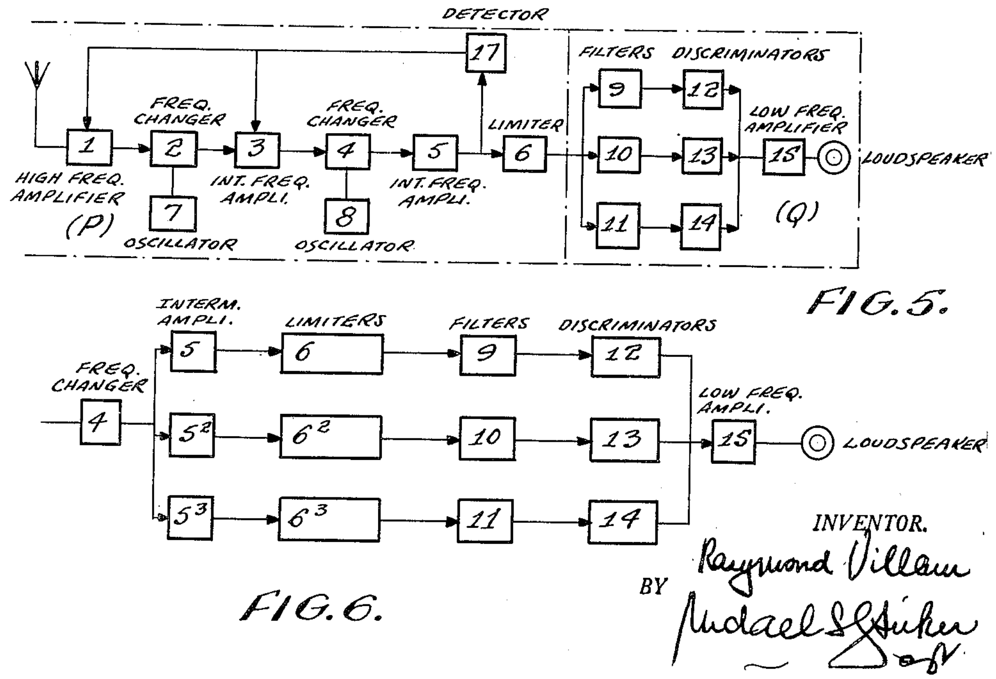
Figs. 5, 6, 7 and 9 are, respectively, block diagrams of receivers which may be used in connection with the present invention.

At the output end of the limiter is arranged the system shown at (Q) in Figure 5; the purpose of this is to separate the signals received, to convert them into amplitude modulated signals and, finally, add together their action in the utilization member.

For this purpose, the output currents from the limited are fed into three filters 9, 10, 11 which are arranged in parallel and the band-pass range of which is about 45 kilocycles per second. These filters respectively isolate the wave-bands of the currents of each of the three stations. Each of said filters is followed by a discriminator 12, 13 and 14, said discriminators respectively producing the amplitude modulation.

Finally, the output of the discriminators 12, 13, 14 are associated in parallel and are fed—through a low frequency amplifier 15, if necessary—to the utilization apparatus 16 which may be a telephone-receiver or a loud-speaker, for example.

It can at once be seen that, according to the position of the mobile station within the area covered by the network and, for example, when it moves along the straight line $x\ x'$ (Figure 2), it will receive at $x_1$ the station B′ alone and only one discriminator will operate; at $x_2$, it will receive the three stations A, C, B′, and the currents from the three discriminators will be added together; between $x_2$ and $x_3$, only the two discriminators corresponding to the stations A and C will operate and so on. It is obvious that all these operations take place without being observed by the operating personnel.

The receiver may advantageously be completed by the provision of automatic volume control, obtained from a detector 17 (Figure 5) connected between 5 and 6, the direct current of this valve controlling the sensitivity of the high-frequency and intermediate frequency amplifiers.

According to a modification of the invention, the selection of the three stations may be effected in the second intermediate frequency stage, so that the various portions of Figure 5 which are located after the second frequency changer take the form shown diagrammatically in Figure 6, in which are shown at 5, 5bis and 5ter the three amplifiers of the second intermediate frequency stage selecting each of the wavelengths of the stationary stations, and at 6, 6bis, 6ter, the three corresponding limiters and discriminators. The other portions numbered 9 to 16 retain the same functions as the correspondingly marked parts in Figure 5.

The foregoing description is concerned with a system of fixed stations with three separate wavelengths. It is quite obvious, however, that, within the scope of the invention, there may be a different number of wavelengths.

Figure 7:
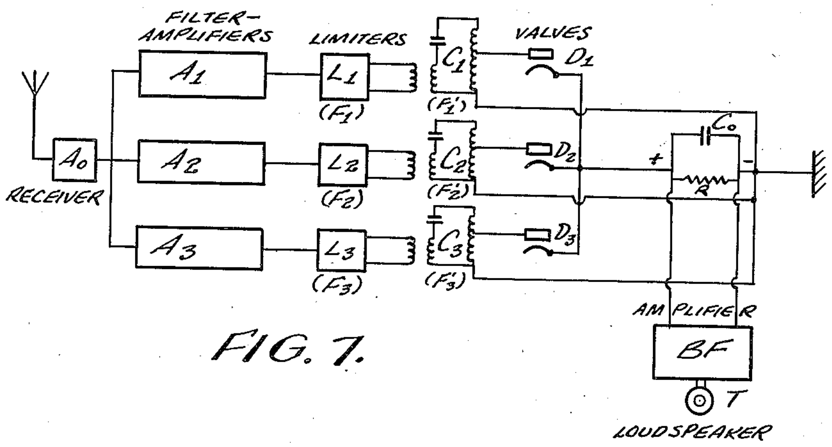

According to a further feature of the invention, the association of the discriminators may advantageously be effected in such a manner as to obtain, with frequency modulation, the same advantages as regards compensation of the level of the received signal as are obtained with amplitude modulation by association of the detectors according to the system known by the name of "diversity." The circuit arrangement is shown in Figure 7, in which $A_0$ designates the common portion of the receiver dealing with three incoming wavelengths; $A_1$, $A_2$, $A_3$ are the combined filter-amplifiers which isolate the received wavelengths after the frequency change, the respective new frequencies being $F_1$, $F_2$, $F_3$ which are respectively fed to the limiters $L_1$, $L_2$, $L_3$.

The frequencies at the output of the limiters are respectively $F_1$, $F_2$, $F_3$ and are fed to selector devices $C_1$, $C_2$, $C_3$, which are shown as a simple selective circuit arrangement in order to simplify the explanation.

Figure 8:
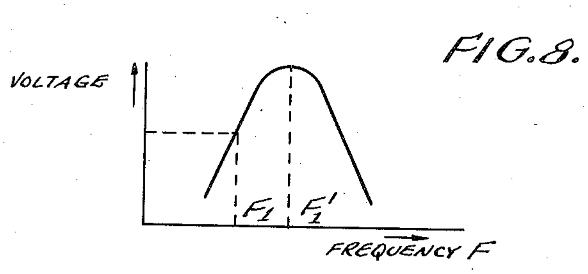
Fig. 8 is a diagram for explaining the operation of the receiver shown in Fig. 7.

The circuits $C_1$, $C_2$ and $C_3$ are tuned to the frequencies $F'_1$, $F'_2$, $F'_3$ and are detuned relatively to the incoming frequencies in such a manner that, for each of them, the incoming frequency is located towards the middle of the resonance curve (Figure 8) and, when there is no modulation in the transmitters, produces a voltage E. Said voltage E, which is fed to the valves $D_1$, $D_2$, $D_3$ (Figure 7) produces a direct current voltage $V_0$ across the terminals of the circuit $C_0R$. The time constant of the circuit $C_0R$ is so adjusted as to filter out the frequencies $F_1$, $F_2$, $F_3$ but to pass the components of the modulation currents.

It will be seen that, under these conditions, the direct current voltage produced by the valve giving the strongest signal prevents the current produced by the other valves from passing. In other words, the low frequency currents from the circuit $C_0R$, which are amplified at BF are those corresponding to the wavelength received at greatest signal strength and, consequently, with the highest signal/noise ratio.

It is to be remarked that whereas simple resonant circuits have been shown at $C_1$, $C_2$, $C_3$, these may be replaced by any other combination of circuits having a suitably selective characteristic.

The advantage of the principle of this device can be extended to the receivers located in the fixed stations, which are all tuned to the common wavelength transmitted by the mobile stations. In this case, use may advantageously be made of a plurality of aerials and a plurality of receivers associated in "diversity of frequency modulation." When the mobile stations are moving inside towns, they are rarely in a permanently direct line of visibility of a single receiving aerial erected at the fixed station. Consequently the waves transmitted by the mobile station reach the aerial of the fixed station after being reflected on various obstacles (buildings), so that the diffraction or reflection components may produce a total effect which is zero.

Figure 9:
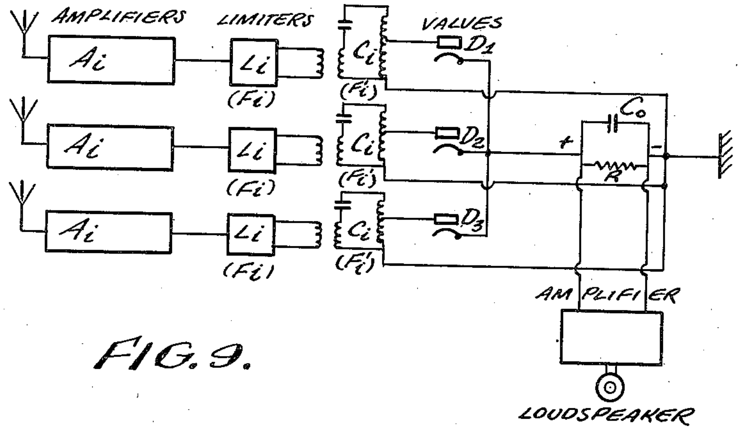

By arranging several aerials for the fixed station at different places, the probability of this phenomenon not occurring on all the aerials at the same time will be increased and by associating the receivers as shown in Figure 9 it will be possible to obtain a signal of much more constant amplitude.

It should, moreover, be noted that these aerials may, in fact, be very close together, since the interference phenomena produced by diffraction or reflection may vary considerably at a distance of a few metres.

In the circuit diagram of Figure 9 all of the elements of Figure 7 are moreover repeated excepting the common portion $A_0$, which is eliminated. The receivers $A_1$, $A_2$, $A_3$ are replaced by three identical receivers $A_i$ each supplied by a separate aerial. The limiters $L_i$ supplying the same frequency $F_i$ and the circuits $C_1$, $C_2$, $C_3$ are in this case all tuned to the same frequency $F'_i$, which is chosen with respect to $F_i$ in the same manner as that shown in Figure 8. The same detectors, the circuit $C_0R$ and the amplifier BF supplying the utilization member T are also present again.

The operation of the system is, of course, the same as that explained with reference to Figure 7 and the signal used corresponds to that supplied by the aerial which receives the wave with the strongest field.

Of course, the invention may be subjected to numerous practical modifications, in particular as regards the peculiarities of the members which can be used as equivalents of those whose combinations come within the characteristics of the invention.

I claim:

1. A radio communication system, comprising in combination, a network including at least six fixed transmitting stations distributed over a territory; and at least one mobile receiving station displaceable within the limits of the territory, all said fixed transmitting stations emitting, at the same time and with corrected phases, identical low frequency signals on carrier waves frequency modulated according to the frequencies of said low frequency signals, each of said fixed stations operating on a single carrier frequency and the carrier frequencies belonging, respectively, to different ones of said fixed stations having at least three different values, any two of said fixed stations being geographically near to each other operating on two different carrier frequencies and any two of said fixed stations operating on the same carrier frequencies being separated from each other by a distance exceeding the sum of the ranges of said fixed stations, each of said receiving stations having a single antenna allowing to receive simultaneously the various frequency modulated waves transmitted by the surrounding ones of said fixed stations, means for amplifying the mixture of these waves, means for separating the frequency spectra corresponding to different carrier frequencies and means for extracting from the frequency spectra the modulating low frequency signal which they contain.

2. A radio communication system, comprising in combination, a network including at least six fixed transmitting stations distributed over a territory; and at least one mobile receiving station displaceable within the limits of the territory, all said fixed transmitting stations emitting, at the same time and with corrected phases, identical low frequency signals on carrier waves frequency modulated according to the frequencies of said low frequency signals, each of said fixed stations operating on a single carrier frequency and the carrier frequencies belonging, respectively, to different ones of said fixed stations having at least three different values, any two of said fixed stations bein geographically near to each other having different carrier frequencies and any two of said fixed stations having the same carrier frequencies being separated from each other by a distance exceeding the sum of the ranges of the respective fixed stations; each of said receiving stations equipped with single means for receiving the various frequency modulated carrier waves transmitted by said fixed stations, means for separating the frequency spectra corresponding to different carrier frequencies, and means for extracting from said frequency spectra the modulated low frequency signals which they contain.

3. A radio communication system, comprising in combination, a network including a plurality of fixed transmitting stations distributed over a territory and sending identical low frequency signals by emitting carrier waves frequency modulated according to the frequencies of said low frequency signals, each of said fixed transmitting stations operating on a single carrier frequency and any two of said fixed transmitting stations being geographically near to each other operating on different carrier frequencies and any two of said fixed transmitting stations operating on the same carrier frequency being separated from each other by a distance exceeding the sum of the ranges of the respective fixed transmitting stations; and at least one mobile receiving station arranged displaceably within the limits of the territory over which said fixed transmitting stations are distributed and including single means for receiving the various frequency modulated carrier waves transmitted by said fixed transmitting stations, means for separating the frequency spectra corresponding to different carrier frequencies and means for extracting from the frequency spectra the modulating low frequency signals which they contain.

RAYMOND VILLEM.

REFERENCES CITED

The following references are of record in the file of this patent:

UNITED STATES PATENTS

| Number | Name | Date |
|---|---|---|
| 1,740,833 | Ranger | Dec. 24, 1929 |
| 1,751,516 | Green | Mar. 25, 1930 |
| 1,766,050 | Young | June 24, 1930 |
| 1,797,746 | Young | Mar. 24, 1931 |
| 1,861,462 | Trouant | June 7, 1932 |
| 1,934,211 | Schroter | Nov. 7, 1933 |

| Number | Name | Date |
|---|---|---|
| 2,019,335 | Carter | Oct. 29, 1935 |
| 2,067,432 | Beverage | Jan. 12, 1937 |
| 2,106,806 | Latimer | Feb. 1, 1938 |
| 2,154,923 | Walter | Apr. 18, 1939 |
| 2,253,867 | Peterson | Aug. 26, 1941 |
| 2,303,542 | Goddard | Dec. 1, 1942 |
| 2,358,448 | Earp | Sept. 19, 1944 |
| 2,383,126 | Hollingsworth | Aug. 21, 1945 |
| 2,407,260 | Dickieson | Sept. 10, 1946 |
| 2,408,692 | Shore | Oct. 1, 1946 |
| 2,413,543 | Carlson | Dec. 31, 1946 |

FOREIGN PATENTS

| Number | Country | Date |
|---|---|---|
| 940,009 | France | May 10, 1948 |